March 30, 1948.  F. H. NICKLE ET AL  2,438,676

SAFETY SHEAR-PIN DRIVE

Filed Dec. 31, 1943

INVENTORS
Frank H. Nickle
Arthur E. Nickle

Patented Mar. 30, 1948

2,438,676

UNITED STATES PATENT OFFICE 2,438,676

SAFETY SHEAR-PIN DRIVE

Frank H. Nickle and Arthur G. Nickle,
Saginaw, Mich.

Application December 31, 1943, Serial No. 516,556

10 Claims. (Cl. 64—28)

This invention relates to a safety driving mechanism for power driving machines that require a shearable pin for drivingly connecting two moving machine elements, one of which elements must stop instantly to avoid damage when fouled or over-loaded. A specific application is the Ear corn crushing machine disclosed in U. S. Letters Patent No. 2,330,139 granted to us under date of September 21, 1943, because such machines frequently encounter tramp metal, or other uncrushable material, in the ear corn or small grain supplied thereto.

The conventional shear-pin is usually driven tightly into its supporting elements, whereby it becomes a troublesome and time-consuming job to remove the pieces after the pin is ruptured, and to drive a new one in its place. An object of this invention is to provide a shear-pin that is a slip fit in the supporting elements, and is yieldably held in working relation with the shearing elements, so that the broken pieces of the ruptured pin may be readily displaced by the new pin without the use of hand tools.

Another object is to provide a reversible shear-pin having a reduced or weakened cross section, at the predetermined point of shear, that will register in proper relation to the shearing elements, regardless as to which end of the pin is in engagement with the yieldable holding means.

Figure 1:
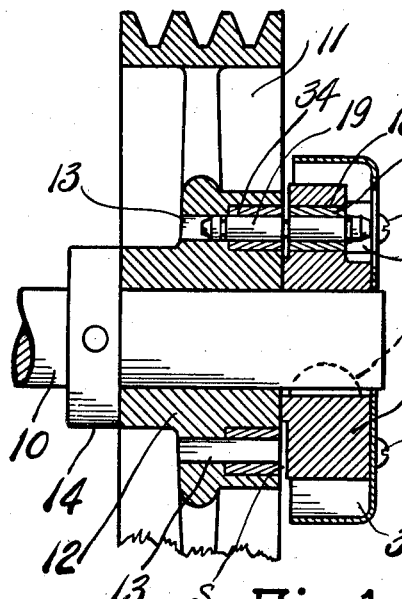
Fig. 1 is a longitudinal cross-sectional view showing the application of the safety shear-pin mechanism to a grooved pulley, the assembly being mounted on a shaft that drives a machine.
Figure 2:
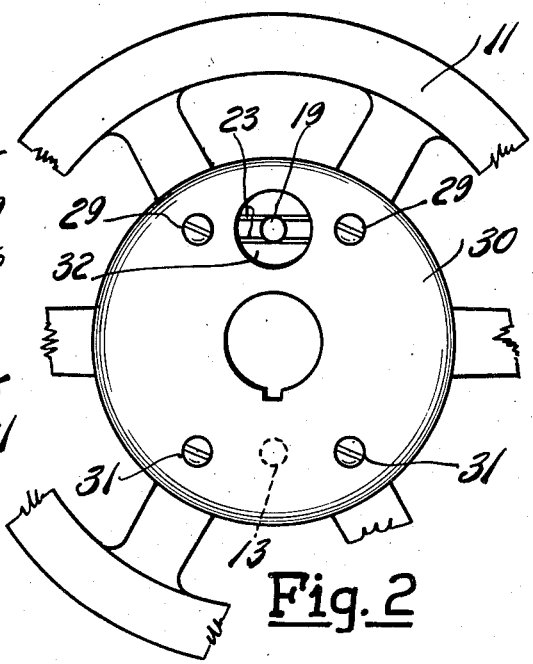
Fig. 2 is a fragmentary end view showing the pulley, shear-pin collar assembly, and the shear-pin holding means.
Figure 3:
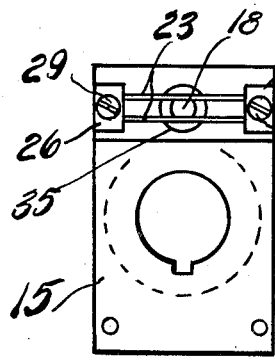
Fig. 3 is an end view of the shear-pin collar and the shear-pin holding means.

Referring to the drawing, in which we have shown the preferred embodiment of our invention, the numeral 10 indicates the drive shaft of a machine (not shown), and on which a pulley 11 is rotatably mounted, this pulley being driven from any convenient source of power. Formed integral with the pulley 11 is a hub 12 having a plurality of circumferentially spaced apertures 13 that are aligned parallel to the shaft and on the same radius. The pulley is held against axial movement on the shaft by means of a conventional set collar 14 on one side, and a shear-pin collar 15 on the opposite side, the shear-pin collar being secured on the shaft by means of the key and set screw 16 and 17 respectively.

The shear-pin collar 15 can be of any desired shape, and is provided with an aperture 18 that also parallels the shaft 10 on the same radius as the apertures 13, thus making it possible to rotate the pulley 11 with respect to the shaft 10 so the aperture 18 will register with one of the apertures 13 to accommodate the shear-pin 19, thereby providing means whereby rotative movement may be transmitted from the pulley to the shaft or contrawise.

Figure 7:
Fig. 7 is an enlarged detail view of the shear-pin.

The shear-pin 19 is formed as shown in Fig. 7, it being preferably but not necessarily cylindrical in shape, and having frusto-conical or tapered ends 20 that may be easily inserted into the apertures 13 and 18. At the shearing point in the middle of the pin is an annular groove or undercut 21 that reduces the cross-sectional area, and consequently weakens the strength of the pin, the reduced area being accurately gauged to transmit the driving torque necessary for the normal operation of the machine, but which will fail by shear when any unusual resistance is encountered which might otherwise damage the machine. On both sides of the shearing point 21, and equidistant therefrom, is an annular groove or undercut 22 that provides a seat for the holding means that will be presently described.

Figure 4:
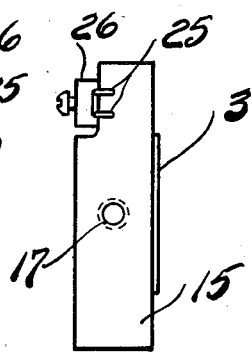
Fig. 4 is an edge view thereof.
Figure 5:
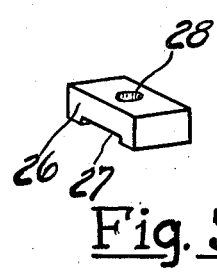
Fig. 5 is an isometric view of a clamping block used to secure the spring in place.
Figure 6:
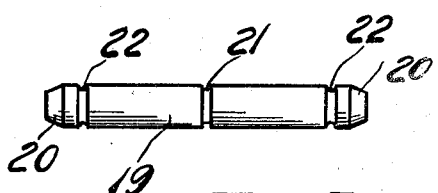
Fig. 6 is an isometric view of the U-shaped spring that is adapted to hold the shear-pin in working relation in the assembly.

The shear-pin holding means, illustrated in Fig. 6, is preferably a U-shaped yieldable spring having parallel legs 23, a bighted end 24 and the opposite ends 25 bent at right angles to the legs. When assembled on the shear-pin collar 15, the legs 23 are held against outward lateral movement by two similar separator blocks 26 that are grooved as at 27 to seat the legs. The centrally disposed hole 28 in the separator block accommodates the screw 29 threaded into the collar 15. The spring is held against longitudinal movement in one direction by looping the bighted end 24 around either one of the screws 29, and against movement in the opposite direction by the bent ends 25 which hook over the edge of collar 15 as shown in Fig. 4.

A circular flanged cover plate 30 is provided as a safety guard against accidents when the shear-pin collar is in motion, this cover plate being mounted over the outer face of the shear-pin collar and secured thereto by screws 29 and 31 or other means. The aperture 32, through which the new shear-pin is introduced into the shear-pin collar, is made large enough to permit the operator to see or feel if the legs 23 of the spring are properly seated in the groove 22 of the shear-pin. Otherwise, the shear-pin might be inadvertently misplaced so that it could not shear off at the weakened shearing point. In this case, the purpose of the shear-pin would be defeated.

It will be further noted that the inner face of the shear-pin collar 15 is provided with an annular shoulder 33 that spaces the shear-pin collar from the adjacent face of the pulley hub and forms a clearance space S therebetween, the object of which is to preclude the possibility of scoring the face of either the shear-pin collar or the pulley hub, should the fracture of the shear-pin produce a jagged edge.

In order to increase the wear resistance of the shearing edges on the pulley hub and shear-pin collar, hardened tool steel bushings 34 and 35 are provided for apertures 13 and 18 respectively, these bushings being renewable when worn to the extent that the pin may be caused to fail by bending rather than shear.

In operation, after the shear-pin 19 is severed by overloading, it can be easily and quickly renewed by cutting off the power, rotating the pulley with respect to the shaft to realign the apertures 18 and 13, and then displacing or ejecting the ruptured pieces of the shear-pin by simply forcing a new pin into place, the abutting frusto-conical ends of the old and new pins being axially aligned so the new pin can be readily pushed between the yieldable legs 23 of the spring. As the shear pins are symmetrical with respect to the shearing point, it will be apparent that they are reversible, thereby eliminating the possibility of the pin being installed wrong end to by an inexperienced operator.

What we claim is:

1. A reversible safety shear-pin adapted for transmitting movement from a driving element to a driven element by a force applied at right angles to the shear-pin, a body having its middle section undercut at the predetermined point of shear, end sections formed with a groove positioned equidistant from the predetermined shearing point, either groove being adapted to seat a pair of yieldable elements for holding the shear-pin in fixed relation with its supporting elements, and means that facilitate pushing the shear-pin between the yieldable holding elements, said means comprising frusto-conical ends thereon.

2. The combination of a drive shaft, a pulley rotatably mounted on the shaft, means secured to the shaft for preventing axial movement of the pulley, said means including a shear-pin collar having a shear-pin aperture parallel to the shaft, a similar aperture on the same radius in the pulley structure that is aligned concentric with the collar aperture, a safety shear-pin seated in the aligned apertures, yieldable means for holding the shear-pin in working relation with pulley and collar, and a removable cover secured to the shear-pin collar for protecting the yieldable shear-pin holding means, said cover having an opening through which the shear-pin is introduced into the shear-pin apertures.

3. A safety driving means for transmitting rotative movement from a driving member to a driven member axially aligned therewith, said means comprising a cylindrical shear-pin having an annular groove near one end thereof, and means carried by one of said members for holding the unsheared shear-pin in proper relation therewith, said holding means comprising a bifurcated element that straddles the shear-pin and seats in opposite sides of the annular groove.

4. In a shear-pin collar assembly adapted for mounting on a shaft for rotation therewith, a collar having an aperture adapted to seat a shear-pin, said pin projecting unequally therefrom on the two sides thereof, means engaging the shorter projecting end for holding the pin in working relation with the collar, and a circular disk that covers the collar and shear-pin holding means, said disk being rigidly secured to the collar for rotation therewith.

5. In a shear-pin collar assembly adapted for mounting on a shaft for rotation therewith, a collar having an aperture adapted to seat a shear-pin, a yieldable U-shaped spring for holding the pin in working relation with the collar, and means for holding the spring in working relation with the collar, said means comprising a screw in the bighted end and a right angle bend in the opposite end of one leg.

6. A reversible shear-pin for drivingly connecting a pair of axially aligned rotatable elements, one of which is secured to a shaft, the said pin having a cylindrical body with frusto-conical shaped ends, an undercut intermediate its length to form a shearing point, and a groove near each end that is adapted to engage means carried by the element that is secured to the shaft for holding the pin in working relation for drivingly connecting the said elements, said grooves being spaced equidistant from the shearing point.

7. In combination, a shaft, a pulley rotatably mounted on the shaft, a shear-pin collar mounted adjacent to the pulley hub and secured to the shaft for rotation therewith, axially aligned apertures in the pulley hub and collar on the same radius, a reversible shear-pin with frusto-conical ends seated in the aligned apertures, said pin having a middle section undercut at a predetermined shearing point and a groove in each end section that is spaced equidistant from the shearing point, and yieldable means engageable with either end groove for holding the pin in a predetermined position until it is ruptured by shear.

8. In combination, a shaft, a pulley rotatably mounted on the shaft, a shear-pin collar secured to the shaft for rotation therewith, a shear-pin in driving engagement with the pulley and shear-pin collar, means for holding the shear-pin in working relation with the pulley and collar, and a circular guard for covering the collar and shear-pin holding means, said guard having an aperture through which the shear-pin may be introduced into the holding means.

9. A safety driving means for transmitting rotative movement from a driving member to a driven member axially aligned therewith comprising, a cylindrical shear-pin formed with an annular groove adjacent one end thereof, means carried by one of said members for holding the unsheared shear-pin in proper relation therewith, said holding means being yieldable with respect to the shear-pin and comprising a bifurcated element that straddles the shear-pin and seats in opposite sides of the annular groove.

10. In a shear-pin collar assembly adapted for mounting on a shaft for rotation therewith, a collar having an aperture adapted to seat a shear-pin, said pin projecting unequally therefrom on the two sides thereof, means engaging the shorter projecting end for holding the pin in working relation with the collar, and a circular disk that covers the collar and shear-pin holding means, said disk being formed with an opening through which the shear pin may be introduced into the shear-pin collar.

FRANK H. NICKLE.
ARTHUR G. NICKLE.

REFERENCES CITED

The following references are of record in the file of this patent:

UNITED STATES PATENTS

| Number | Name | Date |
|---|---|---|
| 525,419 | Hoyt | Sept. 4, 1894 |
| 1,778,477 | Wood | Oct. 14, 1930 |
| 1,849,174 | Carter | Mar. 15, 1932 |
| 1,870,153 | Thoman | Aug. 2, 1932 |
| 2,128,715 | Reich | Aug. 30, 1938 |
| 2,298,316 | Simmons | Oct. 13, 1942 |
| 2,307,556 | Wileman | Jan. 5, 1943 |